Dec. 28, 1965 R. E. ARKO 3,226,477

CODE GENERATING MECHANISM

Filed June 24, 1963 2 Sheets-Sheet 1

INVENTOR
ROBERT E. ARKO
BY
ATTORNEY

Dec. 28, 1965 R. E. ARKO 3,226,477

CODE GENERATING MECHANISM

Filed June 24, 1963 2 Sheets-Sheet 2

United States Patent Office 3,226,477
Patented Dec. 28, 1965

3,226,477
CODE GENERATING MECHANISM

Robert E. Arko, Mount Prospect, Ill., assignor to Teletype Corporation, Skokie, Ill., a corporation of Delaware Filed June 24, 1963, Ser. No. 289,920
9 Claims. (Cl. 178—17)

This invention relates to a keyboard mechanism for telegraph apparatus and more particularly to a keyboard mechanism for generating the elements of a permutational code and accompanying parity check elements.

In certain types of keyboard mechanisms, the code combinations are divided into distinctive groups wherein an element of one condition in one level of the code combination is inverted or changed to a second condition upon the operation of a shift or control key. In this type of keyboard mechanism it is necessary that separate parity check elements be generated for the code combinations in each of these groups.

Accordingly, it is an object of the present invention to generate parity check elements for code combinations in each of two distinct groups of code combinations.

Another object of the invention is to provide a simplified keyboard capable of generating parity check elements for code combinations belonging to different groups of code combinations.

Another object of the invention is to provide a parity check generating means for each of the groups of code combinations so that the depression of a shift or control key renders one associated parity check generating means effective and the others ineffective.

According to the preferred embodiment of the invention, a keyboard mechanism is provided with permutationally settable code bars each movable between one of two positions to represent the marking and spacing elements of a code combination and also to represent a parity check element therefor. The parity check element, as defined herein, is an element which is selectively added to make all of the elements in each code combination either consistently an odd number or conversely an even number of elements. An extra code bar is encoded for release by certain of the operating keys to generate the parity check element for adding an additional element to the intelligence elements corresponding to the depressed key. When it is desired to obtain another code combination from the same key, a shift or control key is depressed prior to the operation of the given key so that an element of the code combination in a given level is inverted, i.e., changed to an opposite nature, and thereby a different code is generated having a different number of elements of one condition. The parity check element for this latter code combination is obtained from a parity code bar rendered effective on operation of the control key. A more complete understanding of the invention may be had by reference to the following detailed description when considered in conjunction with the accompanying drawings wherein:

Figure 1:
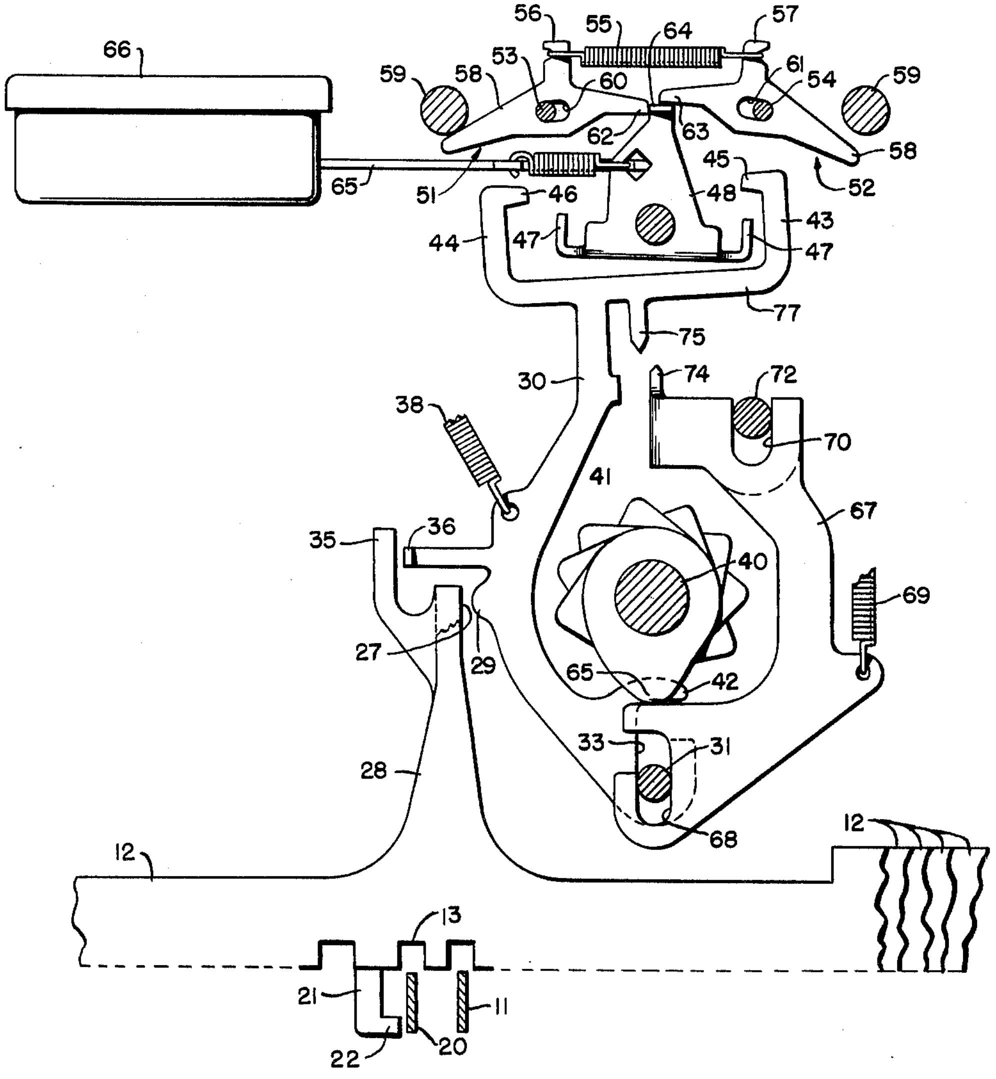
FIG. 1 is a fragmentary elevational view of a signal generator used in conjunction with a keyboard transmitter of a printing telegraph apparatus.

In the embodiment of the invention described hereinafter, the details of the telegraph keyboard transmitter which cooperate with the device according to the present invention, but do not constitute a part of the combination comprising the invention, have not been shown in the drawings and will not be described herein since the keyboard transmitter is shown and described in United States Patent No. 2,607,848, granted August 19, 1952, to W. J. Zenner, and since the signal generator unit employed in the keyboard transmitter of said patent is described in United States Patent No. 2,963,545, granted December 6, 1960, to A. Z. Purzycki. The disclosures of these patents are incorporated herein by reference and made a part hereof as though fully disclosed herein.

The keyboard transmitter has the conventional key levers 11 operable by the keys of a keyboard (not shown) to block or permit the release of selected ones of a plurality of releasable code bars 12 positioned above the key levers 11 for movement transverse thereto. Upon operation of a key of the keyboard the operated key lever 11 moves upwardly into aligned slots in each of the code bars 12–1 to 12–10 to release or block movement of the code bars 12–1 to 12–10 to the right as viewed in FIGS. 1 and 2 under the urging of their respective control springs 14. Depression of any one of the code generating keys causes operation of a reset bail (not shown) to release the code bars 12–1 to 12–10 and they will immediately begin to move rightwardly under the urging of their springs 14. Those of the code bars 12–1 to 12–10 having dependent wards 15 positioned immediately to the left of a raised key lever 11 will have the rightward movement of those code bars blocked. Conversely, when a notch 18 is immediately to the left of the raised key lever 11, its associated code bar 12 is not blocked from rightward movement and its associated code bar 12 is permitted to move rightwardly to cause the generation of a marking element as will be hereinafter explained.

The telegraphic code combinations generated by the keyboard mechanism, herein described, have seven intelligence elements and have added thereto an eighth element of either a marking or spacing condition so as to make the total sum of the elements of marking condition consistently of one order, i.e., either an even or an odd number. The eighth element is termed a parity check element since an error in parity is detected if the generated code combination does not have the proper odd or even number of marking elements therein.

In the present disclosure, the eighth element or parity check element is generated by the code bar 12–8 for the "non-shifted" code combinations and the parity check element for the "shifted" code combinations is supplied by the code bar 12–9. The code combinations generated by this keyboard are those shown and described in the copending application of J. G. Murglin, entitled Code Generating Mechanism, Serial No. 270,843, filed April 5, 1963, now Patent No. 3,154,637, issued on October 27, 1964, which code is commonly referred to as either the data interchange or the bit inversion code. As the latter name implies the depression of a special key called a control or shift key causes the generation of another group of code combinations differing from a first group of code combinations in that an element is inverted from a spacing to a marking condition or vice versa. For example, an element in the fourth level of the code combination may be changed from a spacing element for a given "unshift" code combination to a marking element in an associated "shifted" code combination and conversely a marking element in the fourth level for another code combination may be changed to a spacing element in the fourth level. It will be noted that when a code inversion occurs, due to the depression of a control key, that the total number of marking elements in a given code combination also changes.

Figure 2:
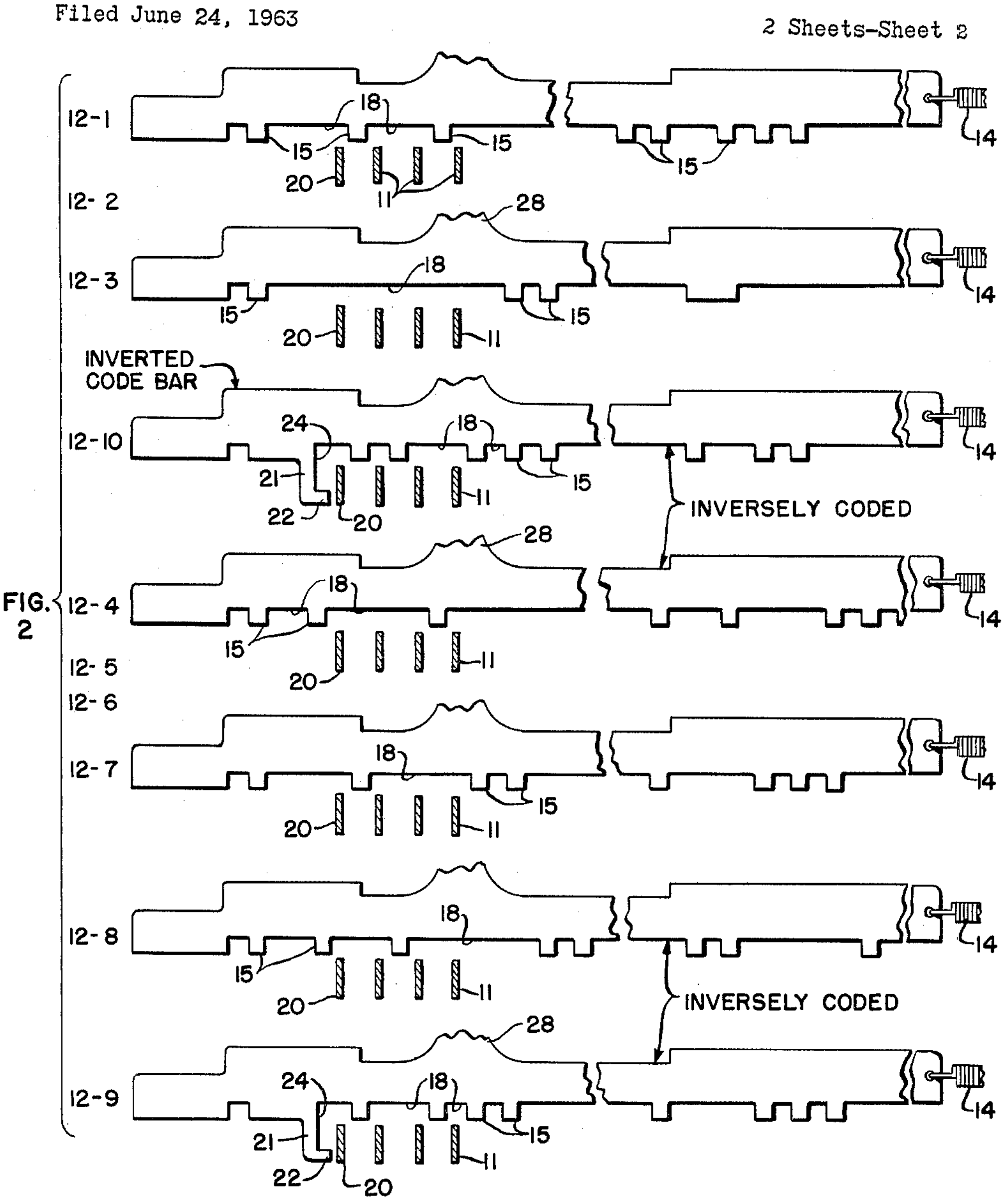
FIG. 2 is an enlarged diagrammatical view showing the relationship of code bars and key levers therefor.
Figure 3:
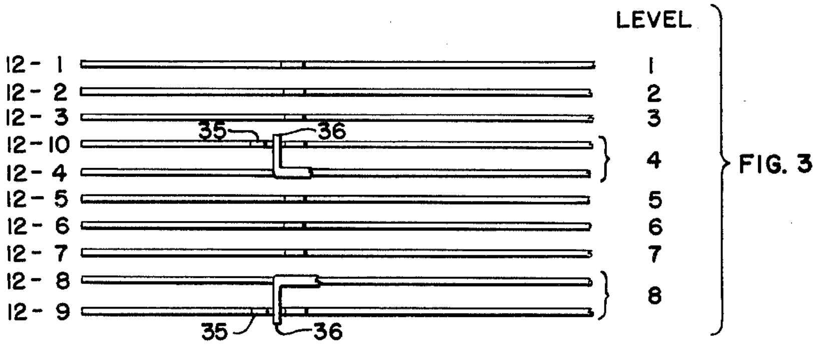
FIG. 3 is a plan view of the code bars, fingers and finger extensions shown in elevation in FIG. 1.

As shown in FIG. 2, the code bar 12–10 is normally disabled from rightward movement by a shift key lever 20, i.e., when the shift key lever 20 is not operated, a foot portion 22 of a depending ward extension 21 on the code bar 12–10 being positioned for engagement with the shift key lever 20 when the code bar 12–10 is released to move rightwardly. In a similar manner the code bar 12–9 is prevented from rightward movement by its ward extension 21 and a foot portion 22 thereon adjacent the shift key lever 20. Thus, so long as the shift key lever 20 remains in this unoperated condition, the inverted code bar 12–10 and the inverted parity generating code bar 12–9 are disabled. Since none of the remaining code bars 12 has a depending ward extension 21, the shift lever 20 does not interfere with their rightward movement while the shift key lever is in its unoperated position.

To generate a shifted code combination, i.e., one having the element in the fourth level inverted, the shift key lever 20 must first be moved upwardly and then the selector key lever 11 is operated to effect the generation of the shifted code combination. The operation of shift key lever 20 does not cause the release of the code bars for rightward movement as the shift key lever 20 is not connected to the release and reset bail (not shown) for the code bars 12–1 to 12–10. It is necessary to operate one of the key levers 11 to cause the release of the reset bail and thereby the release of the code bars 12–1 to 12–10 under urging of their springs 14. When the shift key lever 20 is raised it moves into alignment with a notched area 24 above the foot portion of the ward extension 21 whereby the inverted code bars 12–9 and 12–10 are free to move rightwardly under the urging of their springs 14 unless prevented from so doing by the concurrently operated key lever 11 moving into blocking relation to a dependent ward 15 thereby preventing the rightward movement of the code bar 12–9 or 12–10. Also, when the shift key lever 20 is operated it moves upwardly into a blocking position immediately adjacent a ward 15 on the code bars 12–4 and 12–8 so that the code bars 12–4 and 12–8 cannot be effective to cause the generation of a marking pulse for either the fourth level or the eighth level parity element for the shifted code combinations.

It should be noted that, with the inversion type of code, the inverted code bar 12–10 is coded to cause the generation of either marking or spacing pulses depending upon which key lever 11 is operated. This is in contrast to a six level shift code wherein an extra marking element is added to all of the shifted characters.

Each of the code bars 12 is provided with a vertically projecting portion 28, the upper end of which has a surface 27 for engagement with a cooperating projection 29 on a transfer lever 30. That is, the surfaces 27 on the respective code bars 12 may be selectively moved to engage the projection 29 on the transfer lever 30 and to pivot the transfer lever 30 about its lower end in which there is a slot 33 for slidably and pivotally engaging a pivot shaft 31.

There is one transfer lever 30 associated with each of the code bars 12–1 to 12–8, inclusive. The code bars 12–9 and 12–10 do not have a transfer lever 30 adjacent their upward projections 28, but each of the code bars 12–9 and 12–10 is provided with a finger 35 which extends leftwardly and upwardly (FIG. 1) from its projection 28 for engagement with a transverse extension 36 extending from the transfer levers 30 associated with the code bars 12–4 and 12–8. Since the code bars 12–9 and 12–10 are blocked from moving rightwardly by shift key lever 20 when "nonshifted" code combinations are being generated, the fingers 35 will not move rightwardly to engage the transverse extension 36 to pivot either one of the transfer levers 30. However, when the shift key is depressed to enable the code bars 12–9 and 12–10 to disable the code bars 12–4 and 12–8, the fingers 35 may then engage the transverse extensions 36 as their respective code bars move rightwardly to pivot the associated transfer levers 30 in a clockwise direction about the pivot shaft 31 against the urging of their respective contractile springs 38.

The transfer levers 30 each have a cam follower portion 42 located beneath and associated with one of a plurality of helically arranged transmitting cams 41. Transfer levers 30 are normally biased upwardly and in a counterclockwise direction (FIG. 1) by springs 38 individual to each of the transfer levers, so that the bottom of the groove 33 is normally in engagement with the pivot shaft 31, thereby limiting the upward movement of the transfer levers 30. The transmitting cams 41 are helically arranged around a shaft 40 to effect sequential operation of their associated transfer levers 30. As a transmitting cam 41 engages a cooperating cam follower 42 an reciprocates its associated transfer lever downwardly, the slot 33 allows the transfer lever 30 to move downwardly with respect to the shaft 40.

The transfer lever 30 will be rocked clockwise (FIG. 1) if its associated code bar has moved the vertically projecting portion 28 to the right to engage projection 29 and will remain in the counterclockwise position if its code bar 12 has not moved to the right. Each of the transfer levers 30 is provided at its upper end with a pair of arms 43 and 44. The arms 43 and 44 have inwardly directed and confronting abutment portions 45 and 46, respectively, that are adapted to overhang one of a pair of upwardly directed flange abutments 47 on a transfer bail 48. The transfer bail 48 is intermittently rocked, either in a clockwise direction by an abutment 45 or in the counterclockwise direction by an abutment portion 46, by the sequentially operated transfer levers 30, to control transmitting contacts (not shown) in a contact box 66. The transfer bail 48 is articulated to a link 65 which operates a transmitting contact mechanism that is preferably of the type shown in United States Patent No. 2,605,366, granted July 29, 1952, to W. J. Zenner.

To stabilize the transfer bail 48 and its attached link 65 in a given position so that the contacts within the contact box 66 remain closed and do not bounce or chatter, a pair of stabilizing slides 51 and 52 are supported on studs 53 and 54, respectively, and are biased toward one another by a contractile spring 55 secured between upwardly extending hooks 56 and 57, respectively, on each of the slides 51 and 52 respectively. The stabilizer slides 51 and 52 are guided in their paths of movement by sloped camming surfaces 58 formed thereon which are adapted to slide along fixed posts 59, and are guided by slotted portions 60 and 61 sliding along their pivot studs 53 and 54, respectively. The slides 51 and 52 have confronting ends 62 and 63 which are alternatively in engagement with a laterally directed flange 64 on the transfer bail 48. For example, when slide 51 has its end 62 in engagement with the laterally directed flange 64 of the transfer bail 45 and the transfer bail 45 is rotated in a counterclockwise direction as seen in FIG. 1, the laterally directed flange 64 will force the stabilizer slide 51 to the left and as the camming surface 58 slides against the post 59 and the confronting end 62 of stabilizer slide 51 will rock upwardly and move over the top of the laterally directed flange 64 while the opposed stabilizing slide 52 will have dropped its end 63 downwardly and into engagement with the lateral flange 64 to maintain the transfer bail 45 in its counterclockwise position.

The transfer levers 30 are locked in their rightward or leftward positions at the beginning of a signal generating cycle until a cam lobe 65 holding a locking lever 67 in its downward position rotates in a clockwise direction and permits the locking lever 56 to move upwardly under the influence of a contractile spring 69. The locking lever 67 is guided by its slotted portions 68 and 70 sliding along guide posts 31 and 72, respectively.

The locking lever 67 has a pointed blade 74 at its upper extremity which is adapted to be lifted upwardly and adjacent to dependent pointed blades 75 on each of the transfer levers 30 to prevent rotation of a transfer lever 30 during a transmission cycle. Thus, it should be apparent that as each of the released code bars 12 moves its vertical projection portion 28 rightwardly against projection 29 and thereby moves its respective transfer lever 30 rightwardly, these transfer levers will have placed their pointed blades 75 rightwardly of the pointed blade 74 on the locking lever 67 so that these transfer levers 30 will be locked in this position until the cam lobe 65 on the operating shaft 14 again retracts the locking lever 67 and its pointed blade 74 at the end of a transmitting cycle. Of course, those of the transfer levers 30 that were not released will be positioned in the spacing condition, shown in FIG. 1, and hence the pointed blade 74 on the locking lever 67 will be positioned rightwardly of the pointed blade on these transfer levers 30 locking them in this position. There is, of course, sufficient clearance between the horizontal web 77 of the transfer lever 30 and the pointed blade 74 on the locking lever so that the transfer levers 30 may be reciprocated while the blade 74 is in its upward locking position.

In order to facilitate an understanding of the invention the following brief description of operation is provided.

The key tops (not shown) associated with certain of the key levers 11 are provided with upper and lower designations thereon, e.g.

$$\frac{\#}{c}$$

corresponding to the symbol for "number" and the letter "c." The transmission of these require two distinct code combinations which differ one from another in that the element in the fourth level of one code combination is of an inverted nature from that of the other code combination. Depression of a keytop without the simultaneous depression of a shaft or control keytop causes the generation of the code combination associated with the lower designation on the keytop. As the keytop is depressed, the key lever 11 moves upwardly into locking position adjacent depending wards 15 on those of the code bars associated with the levels which generate spacing elements and into notches 18 on those code bars which are to cause a generation of marking elements. Movement of the key levers upwardly causes the reset and release bail (not shown) to be tripped whereby the code bars 12–1 to 12–10, inclusive, are released for rightward movement under the influence of their attached spings 14.

Those of the code bars 12 that will generate a spacing element are blocked from a significant amount of rightward movement that would cause their projections 28 to rotate their associated transfer levers 30 as the dependent wards 15 on these code bars engage the raised key lever 11. In the fourth level the code bar 12–4 has an upstanding projection 28 operating on its associated projection 29 to pivot the transfer lever 30 if a marking element is to be generated, and likewise, the code bar 12–8 will move its upstanding projection 28 into engagement with the abutment 29 to move transfer lever 30 if a marking element is to be generated at this level. The inverted code bars 12–9 and 12–10 will move only slightly to the right and further movement of them will be blocked by the engagement of the foot portion 22 thereon with the shift key lever 20 in the position shown in FIGS. 1 and 2. Hence, the fingers 35 do not move far enough to engage the transfer extensions 36 extending into their path of movement and do not actuate the transfer lever 30 associated with the code bar 12–4 or the transfer lever 30 associated with the code bar 12–8.

The upward movement of any key bar 11 also causes the transmitting cam shaft 40 to be clutched to a driving source as disclosed in the patent to W. J. Zenner mentioned hereinbefore. As the cam shaft 40 begins to rotate the locking lever 67 moves its pointed blade 74 upwardly between the dependent blades 75 of the transfer levers 30 that have been moved into a marking and spacing condition to prevent the oscillation of the transfer levers 30 until the cam shaft 40 has completed one revolution. The holding cam 65 will move the blade 74 downwardly out of blocking engagement with dependent blade 75 at the end of the cycle of rotation of the shaft 40. As each of the transmitting cams 41 engages its associated cam follower portion 42 of its associated transfer lever 30, it causes the transfer levers 30 to move downwardly and causes the hooks 45 and 46 to move downwardly. If the signal to be generated differs from that previously generated the transfer lever 30 will cause the transfer bail 48 to pivot about its shaft 49 and move the driving link 65 to close the appropriate transmitting contact in the contact box 66. The stabilizers 51 and 52 are then effective to hold the transfer lever 48 in its selected position until the transfer bail 48 is rocked therefrom by either the hook 45 or 46, of the next transfer lever 30, engaging a flange abutment 47 and rotating the transfer bail 48.

If it is desired to generate a code combination associated with the upper designation on one of the keytops, the operator will have to depress the shift or control keytop before actuating the character key to move the shift lever 20 upwardly, whereby the shift key lever 20 is out of the path of the foot portion 22 on code bars 12–9 and 12–10 and is adjacent the notched area 24 on these code bars 12–9 and 12–10. However, the code bars 12–9 and 12–10 do not move rightwardly since they are held as are the remaining code bars by the reset and release bail which is released upon the depression of a code generating key lever 11. After depression of the control or shift key the operator then depresses the selected character or function key to cause the associated key lever 11 to move upwardly into blocking engagement with wards 15 on certain ones of the code bars 12 that should cause the generation of spacing impulses and adjacent notches in the code bars should generate marking elements. The wards 15 on the code bars 12–4 and 12–8 adjacent the now raised shift key lever 20 will block these two code bars against rightward movement. None of the remaining code bars is blocked against rightward movement by the shift key lever 20.

As described above the upward movement of a selected key lever 11 causes the reset and release bail to release code bars 12–1 to 12–10 for rightward movement under the urging of their springs 14. The code bars 12–4 and 12–8 are prevented from rightward movement by the upraised key lever 20 engaging the wards 15 thereon and any of the remaining code bars having a ward 15 adjacent the operated key lever 11 also are prevented from rightward movement and hence will cause the generation of a spacing element. The code bars 12–9 and 12–10 can generate either marking or spacing impulses depending on wether or not a ward 15 is present immediately to the left of the operated key lever 11. Since the code bars 12–9 and 12–10 are inversely encoded with respect to their associated code bars 12–8 and 12–4 they will, in this instance, cause the generation of a pulse the opposite of that normally generated by their companion code bars. When one of the code bars 12–9 or 12–10 has a notch rather than a ward adjacent and at the left of the operated key lever 11, it will move rightwardly and cause its fingers 35 to engage the transfer extension 36 on the transfer lever 30 associated with the fourth and eighth levels of the code elements and rotate these transfer levers 30 to a clockwise or marking position whereby, upon downward movement thereof by an associated transmitting cam 41, the transfer bail 48 will cause the driving link to move the contacts to a marking condition.

Although only one embodiment of the invention is shown in the drawings and described in the foregoing specification, it will be understood that invention is not limited to the specific embodiment described, but is capable of modification and rearrangement and substitution of parts and elements without departing from the spirit of the invention.

What is claimed is:

1. In a keyboard mechanism for generating permutational code combinations divided into first and second groups which groups differ from each other in that an element in one level of the code combinations of one group is the reverse of that in the same level of the other group, (a) a plurality of signal key means selectively operable to control generation of code combinations, a portion of said signal key means being identified with and capable of controlling the generation of code combinations in both said first group and said second group, (b) a plurality of code bar means operable by said signal key means to generate elements of the code combinations of both said first and second groups, (c) control means operable to cause one of said code bar means to reverse the condition of the element generated thereby when a signal key means is operated while the control means is operative, and (d) parity generating means for generating parity check element in the code combinations of the first group of code combinations to maintain the total of the elements in parity and operable upon actuation of said control means to generate a check element in the code combinations of said second group of code combinations to maintain the total of these elements in parity.

2. The keyboard mechanism according to claim 1 wherein:

(a) the signal key means comprise selectively operable key levers, (b) the code bar means comprise bars that are released for movement in each cycle of the apparatus and have blocking wards permutatively arranged on them for cooperation with the key levers selectively to block movement of some of the code bars when a key is operated.

3. In a keyboard mechanism for generating permutational code combinations divided into first and second groups which groups differ from each other in that an element in one level of the code combinations of one group is the reverse of that in the same level of the other group, (a) a plurality of signal key means selectively operable to initiate generation of code combinations, a portion of said signal key means being identified with and capable of initiating the generation of code combinations in both said first group and said second group, (b) a plurality of code bar means operable by said signal key means to generate elements of the code combinations of both said first and second groups, (c) control means operable to cause one of said code bar means to reverse the condition of the element generated thereby when a signal key means is operated concurrently with said control means, (d) a first parity code bar means for generating an additional parity element in the code combinations of said first group, said first parity code bar means being disabled by said control means, and (e) a second parity code bar means normally disabled by said control means and enabled by operation of said control means, said second parity code bar means generating an additional parity element in code combinations of said second parity code bar means generating an additional parity element in code combinations of said second group of code combinations whereby parity is maintained with a reversal of the condition of the elements of the code combinations.

4. In a keyboard mechanism for generating code combinations composed of elements of first and second conditions and for generating parity check elements for the code combinations and wherein said code combinations are divided into different groups of code combinations, (a) signal key means operable to control the generation of permutational code combinations of one of said groups of said code combinations, (b) permutational means individually positionable, by said signal key means, into one of two positions, for generating a first group of code combinations, (c) control means operable to disable a selected one of said permutational means and enable others of said permutational means, (d) a first parity generating means operable by said signal key means to generate an additional parity element to make the total sum of the elements of said first group of code combinations consistently of one binary order, and (e) a second parity generating means enabled by said control means to generate a parity element for each of said second group of code combinations to make the total number of the elements within a given code combination of said second group of code combinations consistently of said one binary order, said control means being operative to disable said first parity generating means when enabling said second parity generating means.

5. In a code generating means for generating code combinations of a permutational code, (a) a plurality of settable means each conditioned for movement from a first position to a second position and indicating the binary condition of an element of a code combination by its position, each of said settable means being associated with a predetermined level of the permutation code, (b) first settable means normally enabled for movement between two positions, said first settable means associated with one of the levels of the permutation code and forming with said plurality of settable means a permutation code combination, (c) second settable means normally disabled from movement, said second settable means associated with the same level of the code as said first settable means, said second settable means forming a code combination with said plurality of settable means when said first settable means is disabled, (d) means normally disabling said second settable means and enabling said first settable means and operable to enable said second settable means and to disable said first settable means whereby, (e) operation of said first settable means and said plurality of settable means form differen code combinations from those code combinations formed by said second settable means and said plurality of settable means.

6. In a printing telegraph keyboard mechanism for controlling the generation of code combinations divided into two groups wherein the groups differ from each other in that an element in one level of the code combination of one group is the reverse of that in the same level of the other group:

(a) a plurality of code bars, one for each level of a code combination to be generated, and selectable for movement from one position to another position to indicate the binary condition of an element of the code combination by its position, (b) an auxiliary code bar associated with one of said plurality of code bars and inversely coded with respect to its associated one of said plurality of code bars, (c) a plurality of key levers for controlling the selective positioning of said plurality of code bars and said auxiliary code bar, and (d) an auxiliary key lever normally blocking operation of said auxiliary code bar and operable to release said auxiliary code bar and to block operation of the one of said plurality of code bars associated with the auxiliary code bar.

7. The keyboard mechanism according to claim 6 wherein the auxiliary code bar and plurality of code bars have wards formed on them in a coded arrangement for cooperation with the plurality of key levers and only the auxiliary code bar and the one of the plurality of code bars associated with theauxiliary code bar have extra wards on them for cooperation with the auxiliary key lever.

8. The keybord mechanism according to claim 7 wherein the extra ward on the auxiliary code bar is positioned to engage the auxiliary key lever when said key lever is in its unoperated position.

9. The keyboard mechanism according to claim 8 wherein the other wards on both the plurality of code bars and the auxiliary code bar are positioned to engage key levers only when the key levers are operated.

References Cited by the Applicant

UNITED STATES PATENTS

| | | |
|---|---|---|
| Re. 20,330 | 4/1937 | Morton. |
| 1,932,932 | 10/1933 | Griffith. |
| 1,988,943 | 1/1935 | Griffith. |
| 2,559,637 | 1/1951 | Kirchel. |
| 3,154,637 | 10/1964 | Murglin. |

NEIL C. READ, *Primary Examiner.*

T. A. ROBINSON, *Assistant Examiner.*

Dedication 3,226,477.—*Robert E. Arko*, Mount Prospect, Ill. CODE GENERATING MECHANISM. Patent dated Dec. 28, 1965. Dedication filed Aug. 20, 1969, by the assignee, *Teletype Corporation*.

Hereby dedicates to the People of the United States the entire term of said patent.

[*Official Gazette December 9, 1969.*]